United States Patent
Shibuya et al.

(10) Patent No.: US 7,282,310 B2
(45) Date of Patent: Oct. 16, 2007

(54) RADIOGRAPHIC IMAGE CONVERSION PANEL AND PRODUCTION METHOD THEREOF

(75) Inventors: Hideki Shibuya, Tokyo (JP); Kuniaki Nakano, Uenohara-machi (JP); Shigetami Kasai, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/593,556

(22) Filed: Nov. 7, 2006

(65) Prior Publication Data

US 2007/0054213 A1    Mar. 8, 2007

Related U.S. Application Data

(62) Division of application No. 11/228,235, filed on Nov. 10, 2005, now Pat. No. 7,153,637, which is a division of application No. 10/938,817, filed on Sep. 13, 2004, now abandoned.

(30) Foreign Application Priority Data

| Sep. 17, 2003 | (JP) | ............... 2003-324578 |
| Sep. 17, 2003 | (JP) | ............... 2003-324610 |
| Sep. 17, 2003 | (JP) | ............... 2003-324650 |
| Sep. 17, 2003 | (JP) | ............... 2003-324658 |

(51) Int. Cl.
*G03B 42/08* (2006.01)
*H05B 33/00* (2006.01)
*G03C 1/725* (2006.01)
*G03C 1/74* (2006.01)

(52) U.S. Cl. .............. 430/21; 430/139; 430/496; 250/484.4; 427/157; 427/155.39

(58) Field of Classification Search ............... 430/21, 430/139, 496; 250/484.4; 427/157, 255.39
See application file for complete search history.

(56) References Cited

U.S. PATENT DOCUMENTS

| 5,851,428 | A  | * | 12/1998 | Matsuda et al. ...... 252/301.4 R |
| 6,707,050 | B2 | * | 3/2004  | Hosoi .................... 250/484.4 |
| 2002/0192501 | A1 | * | 12/2002 | Yano et al. ............... 428/690 |
| 2004/0069955 | A1 |   | 4/2004  | Maezawa et al. |
| 2004/0104376 | A1 |   | 6/2004  | Maezawa et al. |
| 2004/0155224 | A1 |   | 8/2004  | Nakano et al. |
| 2004/0159801 | A1 | * | 8/2004  | Kishinami et al. ....... 250/484.4 |
| 2005/0040340 | A1 |   | 2/2005  | Morikawa et al. |

FOREIGN PATENT DOCUMENTS

| EP | 0 437 355 |   | 7/1991 |
| EP | 437355    | * | 7/1991 |
| EP | 1 191 081 |   | 3/2002 |
| EP | 191081    | * | 3/2002 |
| EP | 1 288 680 |   | 3/2003 |
| EP | 1288680   | * | 3/2003 |

* cited by examiner

*Primary Examiner*—Richard L. Schilling
(74) *Attorney, Agent, or Firm*—Finnegan, Henderson, Farabow, Garrett & Dunner, L.L.P.

(57) ABSTRACT

A radiographic image conversion panel containing a substrate having thereon a phosphor layer formed by a vapor-accumulating method, wherein the phosphor layer has a thickness distribution of not more than ±20%, the thickness distribution being defined by the formula: $((D_{max}-D_{min})/(D_{max}+D_{min}))\times100$, provided that $D_{max}$ is a maximum thickness of the phosphor layer; and $D_{min}$ is a minimum thickness of the phosphor layer.

7 Claims, 3 Drawing Sheets

ISOTROPIC

ANISOTROPIC

ANISOTROPIC

RADIOGRAPHIC IMAGE CONVERSION PANEL AND PRODUCTION METHOD THEREOF

This Application is a division of U.S. application Ser. No. 11/228,235, filed Nov. 10, 2005 now U.S. Pat. No. 7,153,637, which is a division of U.S. application Ser. No. 10/938,817, filed Sep. 13, 2004, now abandoned, which claims priority to Japanese Patent Application Nos.: JP2003-324578, JP2003-324610, JP2003-324650, and JP2003-324658, all of which were filed on Sep. 17, 2003, all of which are incorporated herein by reference.

FIELD OF THE INVENTION

The present invention relates to a radiographic image conversion panel, in which a stimulable phosphor substance layer is formed on a support by means of a vapor-accumulating method, and a manufacturing method of the radiographic image conversion panel.

BACKGROUND OF THE INVENTION

In recent years, a radiographic image conversion panel in which a stimulable phosphor substance is formed on a support is utilized for recording radiographic images. In this method, a portion of the radiation transmitted through a subject for image taking is absorbed by a stimulable phosphor substance layer formed on a radiographic image conversion panel. Thereafter, excitation light such as laser light is irradiated on the stimulable phosphor layer to make radiation energy accumulated in a stimulable phosphor layer emit as phosphor light which is detected, resulting in formation of images.

As a method to form a stimulable phosphor substance layer on such a radiographic image conversion panel, there is known a method in which a binder is mixed with a stimulable phosphor substance and the resulting mixture is coated on a support. However, this method may lower the purity of a stimulable phosphor substance causing decreasing the efficiency of excitation light penetration and stimulated emission, and resulting in deterioration of image qualities such as sharpness and granularity of recorded images. Therefore, a method to form a stimulable phosphor substance layer by means of a vapor-accumulating method (or a gas phase accumulation method) has been developed to improve image quality of recorded images (for example, refer to a Patent Literature 1). In this method, since a stimulable phosphor substance layer contains only a stimulable phosphor substance without a binder, the efficiency of excitation light penetration and stimulated emission is improved resulting in obtaining images of high quality.

A conventional manufacturing method of a radiograph image conversion panel by a vapor-accumulating method will be now explained referring to FIG. 4.

In a vapor-accumulating method, a stimulable phosphor substance is accumulated on a support by means of evaporation or sputtering, and, for example, evaporation system 10 shown in FIG. 4 has been utilized in case of an evaporation method. Evaporation system 10 contains vacuum chamber 12 equipped with vacuum pump 11, vapor source 13, and support transporting mechanism 14 which supports support S as well as transports support S back and forth against vapor source 13 in the horizontal direction in said vacuum chamber 12. Further, in this evaporation system 10, slit plate 15 is installed between vapor source 13 and support S to restrict evaporation onto support S, while transferring support S.

In this evaporation system 10, a stimulable phosphor substance layer can be formed nearly uniformly onto all over support S by evaporating vapor of a stimulable phosphor substance which has passed through slit 15 from vapor source onto support S.

A radiographic image conversion panel utilized in this radiographic image recording and reproducing method contains a support and a stimulable phosphor substance layer provided on the support. As a stimulable phosphor substance, utilized is one which comprises an alkali halide such as CsBr as a mother substance being activated with Eu, and it is considered that an X-ray conversion efficiency can be improved, which has been impossible heretofore, specifically by employing Eu as an activator.

Further, there is a correlation between the concentration of an activator and the luminance, and the higher is the concentration of an activator, the higher is the sensitivity. And the sensitivity is saturated at the limiting concentration of an activator at which excitation light can penetrate into the phosphor substance layer and make the accumulated energy to release at the time of reading. Therefore, the more non-uniform is the concentration of an activator, the more uneven is the sensitivity.

Therefore, by making the concentrations of an activator (a mol ratio of an activator to a mother substance) of arbitrary two points in a phosphor substance layer into a predetermined range, developed has been a radiographic image conversion panel which has an improved sensitivity as well as can provide radiographic images of high image quality (refer to patent literature 2).

[Patent Literature 1] Japanese Patent Publication Open to Public Inspection (JP-A) No. 2002-214397.

[Patent Literature 2] JP-A No. 2003-28994

SUMMARY OF THE INVENTION

Since a stimulable phosphor substance layer absorbs radiation and accumulate the energy, the thicker is the layer thickness of a stimulable phosphor substance layer, the higher becomes the sensitivity, and the sensitivity is saturated at a certain layer thickness at which radiation energy accumulated in a stimulable phosphor substance is able to be released.

However, in evaporation system 10 of the above constitution, vapor generated from vapor source 13 may proceed irregularly from slit 15 to the side of support S to cause unevenness in the layer thickness of a stimulable phosphor substance layer. Therefore, a higher sensitive portion and a lower sensitive portion are generated locally on a panel resulting in sensitivity unevenness.

On the other hand, since the expansion factor of a stimulable phosphor substance layer containing CsBr is large, stress is generated on a support. Therefore, balance of stress is lost when the layer thickness is uneven depending on the direction, and there has been caused a problem of bending of a panel in which a stimulable phosphor substance layer is formed on a support. In particular, when a support is formed by accumulating a plurality of sheets of a carbon fiber reinforced resin sheet is applied, bending along the direction of carbon fibers in the support results. A panel having a bend is weak against impact and often generate cracks in a stimulable phosphor substance layer. Further, sensitivity unevenness may be caused due to bending.

An object of the invention is to provide a radiographic image conversion panel having a decreased bending property and a decreased sensitivity unevenness.

An embodiment of the present invention includes a radiographic image conversion panel containing a substrate having thereon a phosphor layer formed by a vapor-accumulating method, wherein the phosphor layer has a small amount of a thickness distribution, the thickness distribution being defined by the following formula:

$$((D_{max}-D_{min})/(D_{max}+D_{min}))\times 100,$$

provided that $D_{max}$ is a maximum thickness of the phosphor layer; and $D_{min}$ is a minimum thickness of the phosphor layer.

DESCRIPTION OF THE PREFERRED EMBODIMENTS

Figure 1:
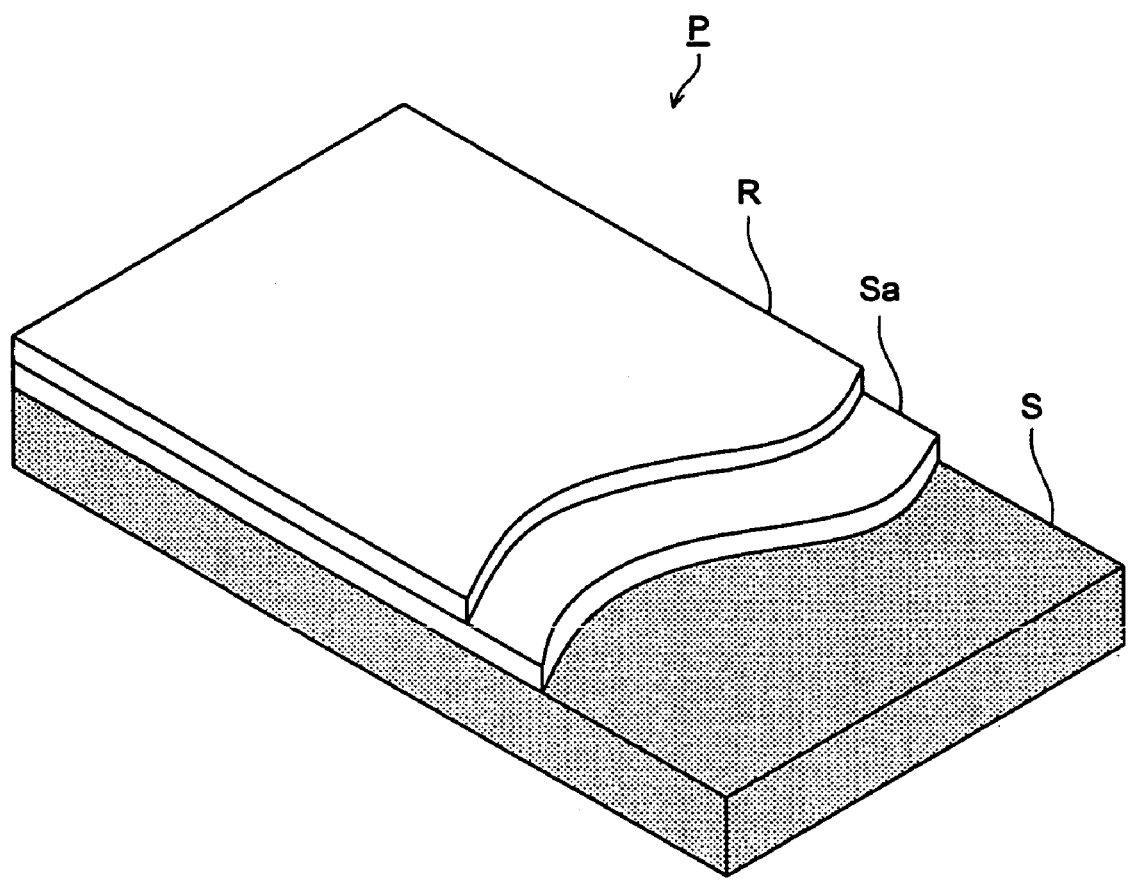
FIG. 1 is a drawing to show a radiographic image conversion panel according to an embodiment of the present invention.

1. An embodiment of the present invention includes a radiographic image conversion panel containing a substrate having thereon a phosphor layer formed by a vapor-accumulating method,
   wherein the phosphor layer has a thickness distribution of not more than ±20%, the thickness distribution being defined by the following formula:

$$((D_{max}-D_{min})/(D_{max}+D_{min}))\times 100,$$

provided that $D_{max}$ is a maximum thickness of the phosphor layer; and $D_{min}$ is a minimum thickness of the phosphor layer.

2. Another embodiments of the present invention includes a radiographic image conversion panel of Item 1,
   wherein the thickness distribution of the phosphor layer is isotropic from a center of the radiographic image conversion panel.

3. Another embodiments of the present invention includes a radiographic image conversion panel of Item 2,
   wherein the thickness distribution is not more than ±15%.

4. Another embodiments of the present invention includes a radiographic image conversion panel of Item 2,
   wherein the thickness distribution is not more than ±10%.

5. Another embodiments of the present invention includes a radiographic image conversion panel of Item 2,
   wherein the thickness distribution is not more than ±5%.

6. Another embodiments of the present invention includes a radiographic image conversion panel of Item 2,
   wherein the phosphor layer contains an alkali metal halide stimulable phosphor represented by Formula (I):

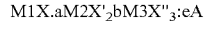  Formula (I)

M1X.aM2X'$_2$bM3X"$_3$:eA wherein, M1 represents an alkali metal atom selected from the group consisting of Li, Na, K, Rb and Cs; M2 represents a divalent metal atom selected from the group consisting of Be, Mg, Ca, Sr, Ba, Zn, Cd, Cu and Ni; M3. represents a trivalent metal atom selected from the group consisting of Sc, Y, La, Ce, Pr, Nd, Pm, Eu, Gd, Tb, Dy, Ho, Er, Tm, Yb, Lu, Al, Ga and In, X, X' and X" each represent independently a halogen atom selected from the group consisting of F, Cl, Br and I; A represents a metal atom selected from the group consisting of Eu, Tb, In, Ce, Tm, Dy, Pr, Ho, Nd, Yb, Er, Gd, Lu, Sm, Y, Ti, Na, Ag Cu and Mg; and a, b and e each represents a number in a range of $0 \leq a < 0.5$, $0 \leq b < 0.5$ and $0 < e < 1.0$, respectively.

7. Another embodiments of the present invention includes a method of producing the radiographic image conversion panel of Item 2, which comprises:
   placing the phosphor in a vapor source in a vacuum chamber of an evaporating apparatus;
   heating the vapor source so as to deposit the phosphor onto the substrate which is held by a supporting member in the vacuum chamber,
   wherein the substrate is rotated during the heating with respect to the vapor source by the supporting member which is provided with a rotation mechanism.

8. Another embodiments of the present invention includes a radiographic image conversion panel of Item 1,
   wherein the thickness distribution of the phosphor layer is isotropic from a center of the radiographic image conversion panel, and the phosphor layer has a thickness variation coefficient of not more than 40%, the thickness variation coefficient being defined by the following formula:

$$(D_{dev}/D_{av})\times 100,$$

provided that $D_{av}$ is an average thickness of the phosphor layer; and $D_{dev}$ is a standard deviation of thickness of the phosphor layer.

9. Another embodiments of the present invention includes a radiographic image conversion panel of Item 8, wherein the phosphor layer has the thickness variation coefficient of not more than 30%.

10. Another embodiments of the present invention includes a radiographic image conversion panel of Item 8, wherein the phosphor layer has the thickness variation coefficient of not more than 20%.

11. Another embodiments of the present invention includes a radiographic image conversion panel of Item 8, wherein the phosphor layer has the thickness variation coefficient of not more than 10%.

12. Another embodiments of the present invention includes a radiographic image conversion panel of Item 8,
    wherein the phosphor layer contains an alkali metal halide stimulable phosphor represented by Formula (I).

13. Another embodiments of the present invention includes a method of producing the radiographic image conversion panel of Item 8, which comprises:
    placing the phosphor in a vapor source in a vacuum chamber of an evaporating apparatus;
    heating the vapor source so as to deposit the phosphor onto the substrate which is held by a supporting member in the vacuum chamber,
    wherein the substrate is rotated during the heating with respect to the vapor source by the supporting member which is provided with a rotation mechanism.

14. Another embodiments of the present invention includes a radiographic image conversion panel comprising a substrate having thereon a phosphor layer formed by a vapor-accumulating method, the phosphor containing a mother component and an activator, wherein a density variation coefficient of the activator in a surface direction of the phosphor layer is not more than 40%.
15. Another embodiments of the present invention includes a radiographic image conversion panel of Item 14, wherein the density distribution of the activator in the phosphor layer is isotropic from a center of the radiographic image conversion panel.
16. Another embodiments of the present invention includes a radiographic image conversion panel of Item 15, wherein the density variation coefficient of the activator in the phosphor layer is not more than 30%.
17. Another embodiments of the present invention includes a radiographic image conversion panel of Item 15, wherein the density variation coefficient of the activator in the phosphor layer is not more than 20%.
18. Another embodiments of the present invention includes a radiographic image conversion panel of Item 15, wherein the density variation coefficient of the activator in the phosphor layer is not more than 10%.
19. The radiographic image conversion panel of Item 15, wherein the phosphor layer contains an alkali metal halide stimulable phosphor represented by Formula (I).
20. Another embodiments of the present invention includes a method of producing the radiographic image conversion panel Of Item 15, which comprises:
placing the phosphor in a vapor source in a vacuum chamber of an evaporating apparatus;
heating the vapor source so as to deposit the phosphor onto the substrate which is held by a supporting member in the vacuum chamber,
wherein the substrate is rotated during the heating with respect to the vapor source by the supporting member which is provided with a rotation mechanism.
21. Another embodiments of the present invention includes a radiographic image conversion panel comprising a substrate having thereon a phosphor layer formed by a vapor-accumulating method, the phosphor containing a mother component and an activator,
wherein a density variation coefficient of the activator in a depth direction of the phosphor layer is not more than 40%.
22. Another embodiments of the present invention includes a radiographic image conversion panel of Item 21, wherein a density distribution of the activator in the phosphor layer is isotropic from a center of the radiographic image conversion panel.
23. Another embodiments of the present invention includes a radiographic image conversion panel of Item 22, wherein the density variation coefficient of the activator in the phosphor layer is not more than 30%.
24. Another embodiments of the present invention includes a radiographic image conversion panel of Item 22, wherein the density variation coefficient of the activator in the phosphor layer is not more than 20%.
25. Another embodiments of the present invention includes a radiographic image conversion panel of Item 22, wherein the density variation coefficient of the activator in the phosphor layer is not more than 10%.
26. Another embodiments of the present invention includes a radiographic image conversion panel of Item 22, wherein the phosphor layer contains an alkali metal halide stimulable phosphor represented by Formula (I).
27. Another embodiments of the present invention includes a method of producing the radiographic image conversion panel of Item 22, which comprises:
placing the phosphor in a vapor source in a vacuum chamber of an evaporating apparatus;
heating the vapor source so as to deposit the phosphor onto the substrate which is held by a supporting member in the vacuum chamber,
wherein the substrate is rotated during the heating with respect to the vapor source by the supporting member which is provided with a rotation mechanism.

According to an embodiment of the present invention, since a phosphor substance layer is provided so as to have a layer thickness-distribution of a phosphor substance layer of not more than ±20% and a layer thickness distributed to have the same thickness concentric circular from the center of a phosphor substance layer, it is possible to make the layer thickness more uniform to depress sensitivity unevenness as well as to cancel stress generated on a panel by formation of a phosphor substance layer resulting in depression of bending of the panel.

According to an embodiment of the present invention, since a phosphor substance layer is provided so as to have a layer thickness distribution of a phosphor substance layer of not more than ±15%, it is possible to make the layer thickness more uniform resulting in further depression of sensitivity unevenness.

According to an embodiment of the present invention, since a phosphor substance layer is provided so as to have a layer thickness distribution of a phosphor substance layer of not more than ±10%, it is possible to make the layer thickness more uniform resulting in further depression of sensitivity unevenness.

According to an embodiment of the present invention, since a phosphor substance layer is provided so as to have a layer thickness distribution of a phosphor substance layer of not more than ±5%, it is possible to make the layer thickness more uniform resulting in remarkably depression of sensitivity unevenness.

According to an embodiment of the present invention, since a coefficient of variation of a layer thickness in the phosphor substance layer is not more than 40% and a layer thickness is distributed concentric circularly from the center of the phosphor substance layer, it is possible to make the layer thickness more uniform resulting in depression of sensitivity unevenness as well as to cancel stress generated on a panel by formation of a phosphor substance layer resulting in depression of bending of the panel.

According to an embodiment of the present invention, since a coefficient of variation of a layer thickness in the phosphor layer is not more than 30%, it is possible to make the layer thickness more uniform resulting in further depression of sensitivity unevenness.

According to an embodiment of the present invention, since a coefficient of variation of a layer thickness in the phosphor layer is not more than 20%, it is possible to make the layer thickness more uniform resulting in further depression of sensitivity unevenness.

According to an embodiment of the present invention, since a coefficient of variation of a layer thickness in the phosphor layer is not more than 10%, it is possible to make the layer thickness more uniform resulting in further depression of sensitivity unevenness.

According to an embodiment of the present invention, it is possible to apply a stimulable phosphor substance, $M1X.aM2X'_2bM3X''^3$: eA, represented by general formula (1) as a starting material of a phosphor substance layer.

According to an embodiment of the present invention, since a phosphor substance is evaporated on a support while the support is rotated, it is possible to form a phosphor layer on a support so as to have more uniform layer thickness of the phosphor substance as well as a concentric circular layer thickness distribution from the center of the phosphor substance layer. Therefore, it is possible to reduce layer thickness distribution or the coefficient of variation of the phosphor substance layer as well as to compensate stress generated on a panel, resulting in manufacturing a radiographic image conversion panel having minimum sensitivity unevenness and little bending.

In the following, the present invention will be detailed.

FIG. 1 shows radiographic image conversion panel P applied in the present invention.

Radiographic image conversion panel P contains a support S and stimulable phosphor substance layer R, in which prismatic crystals of a stimulable phosphor substance is formed by a vapor-accumulating method, on said support S, and a protective layer to protect stimulable phosphor substance layer R (being not shown in the drawing) is appropriately provided on this stimulable phosphor substance layer R.

A material of support S can be arbitrarily selected from commonly known materials as a support of a conventional radiographic image conversion panel, however, a support in the case of forming a phosphor substance layer by a vapor-accumulating method are preferably quartz glass, a metal sheet comprising such as aluminum, iron, tin or chromium, a carbon fiber reinforced resin sheet comprising a sheet of carbon fibers which are oriented in one direction and contain heat resistive resin.

Further, support S is preferably provided with resin layer Sa which makes the support surface smooth. Resin layer Sa preferably contains a compound such as polyimide, polyethylene terephthalate, paraffin and graphite, and the layer thickness is preferably approximately 5-50 μm. This resin layer may be provided either on the front or the backside surface of support S, or may be provided on the both surfaces.

Further, a means to provide resin layer Sa on support S includes a lamination method and a coating method. A lamination method is performed by use of heat rollers or pressure rollers, and preferable conditions are heating at approximately 80-150° C., pressing at 4.90–2.94×102 (N/cm) and a transport rate of 0.1-2.0 (m/sec).

In above general formula (1), M1 represents at least one type of an alkali earth metal atom selected from each atom of Li, Na, K, Rb and Cs, among them preferably at least one type of atom selected from each atom of Rb and Cs and more preferably Cs atom.

Further, M2 represents at least one type of a divalent metal atom selected from each atom of Be, Mg, Ca, Sr, Ba, Zn, Cd, Cu and Ni, and among them preferably utilized is an atom selected from Be, Mg, Ca, Sr and Ba.

M3 represents at least one type of a trivalent metal atom selected from each atom of Sc, Y, La, Ce, Pr, Nd, Pm, Eu, Gd, Tb, Dy, Ho, Er, Tm, Yb, Lu, Al, Ga and In, and among them preferably utilized is an atom selected from Y, Ce, Sm, Eu, Al, La, Gd, Lu, Ga and In.

A represents at least one type of a metal atom selected from each atom of Eu, Tb, In, Ce, Tm, Dy, Pr, Ho, Nd, Yb, Er, Gd, Lu, Sm, Y, Tl, Na, Ag, Cu and Mg, and among them preferably Eu atom.

X, X' and X" represent at least one type of a halogen atom selected from F, Cl, Br and I, preferably one type of a halogen atom selected from F, Cl and Br and more preferably Br atom, with respect to emission strength improvement of stimulated emission of stimulable phosphor substance.

Further, in general formula (1), a, b and e each are values in ranges of $0 \leq a < 0.5$, $0 \leq b < 0.5$ and $0 < e < 1.0$, respectively, and preferably $0 \leq b < 10^{-2}$.

Stimulable phosphor substances represented by general formula (1) of the present invention are manufactured, for example, by the following method.

First, the following starting materials (a), (b) and (e), as phosphor substance raw materials, are prepared.

Starting material (a): at least one or two types of compounds selected from NaF, NaCl, NaBr, NaI, KF, KCl, KBr, KI, RbBr, RbI, CsF, CsCl, CsBr and CsI.

Starting material (b): at least one or two types of compounds selected from $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2.2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$.

Starting material (e): compounds containing a metal atom selected from Eu, Tb, In, Ce, Tm, Dy, Pr, Ho, Nd, Yb, Er, Gd, Lu, Sm, Y, Tl, Na, Ag Cu and Mg.

Phosphor substance starting materials, (a), (b) and (e), which are weighed so as to be the values in the ranges of a, b and e of general formula (1), are dissolved in pure water. At this time, the starting materials may be sufficiently mixed by use of such as a mortar, a ball mill and a mixer mill.

Next, after adding a predetermined acid so as to adjust pH value C of the prepared aqueous solution at $0 < C < 7$, water is evaporated.

Then, the mixture of stating materials obtained by evaporation of water was charged into a heat-resistant vessel such as a quartz crucible or an alumina crucible and is burned in an electric furnace. The burning temperature is preferably 500-1000° C. The burning time differs depending on such as a charging amount of starting materials and a burning temperature, however, is preferably 0.5-6 hours. Further, the burning atmosphere is preferably a nitrogen gas atmosphere containing a small amount of a hydrogen gas, a weakly reducing atmosphere such as a carbon gas atmosphere containing a small amount of carbon monoxide, neutral atmospheres such as a nitrogen atmosphere and an argon atmosphere, or a weakly oxidizing atmosphere containing a small amount of an oxygen gas.

Herein, in the case that the burned substance is taken out of an electric furnace and ground after having been once burned in the above burning condition, thereafter, the burned substance powder is charged into a heat-resistant vessel and placed in an electric furnace to be burned again in the same condition as the above; a desired stimulable emission luminance of a stimulable phosphor substance can be obtained also by being taken out of an electric furnace followed by being spontaneously cooled in air, however, the burned substance may be cooled in a weakly reducing atmosphere or a neutral atmosphere which is same as that during burning.

Further, it is preferable that a burned substance is transferred from a heating section to a cooling section within a furnace and rapidly cooled in a weakly oxidizing atmosphere because a stimulable emission luminance of the obtained stimulable phosphor substance can be further increased.

The stimulable phosphor substance thus manufactured is evaporated on support S by means of a vapor-accumulating method resulting in formation of stimulable phosphor substance layer R. As a vapor-accumulating method, evaporation method, a sputtering method, a CVD (Chemical Vapor Deposition) method, an ion-plating method and other methods can be employed and a evaporation method is specifically preferable in the present invention.

In the following, explained will be an example of evaporating a stimulable phosphor substance on support S by an evaporation method suitable to the present invention.

Figure 2:
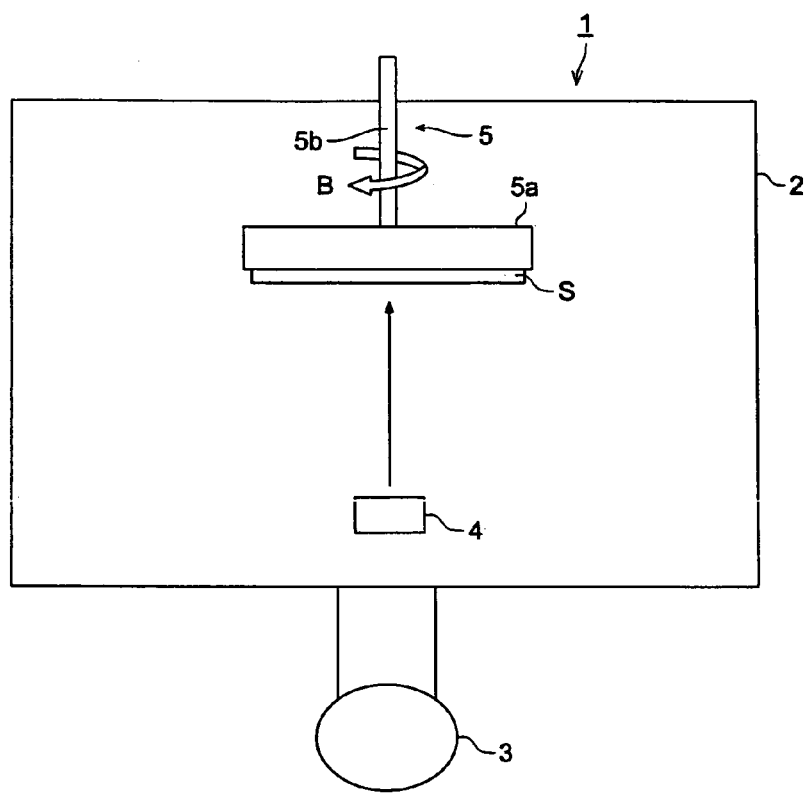
FIG. 2 is a cross-sectional drawing to show a brief constitution of an evaporation system according to the present invention.

In the evaporation, evaporation system 1 shown in FIG. 2 is employed. As shown in FIG. 2, evaporation system 1 contains vacuum chamber 2, vacuum pump 3 which performs evacuation and air introduction of the vacuum chamber 2, vapor source 4 which is arranged in vacuum chamber 2 and evaporates a vapor on support S, and support rotating mechanism 5 which holds support S and rotates support S against vapor source 4.

Vapor source 4 may contain an alumina crucible wound with a heater or a heater comprising a boat or a high melting temperature metal, to accommodate a stimulable phosphor substance to be heated by a resistance heating method Further, a method to heat a stimulable phosphor substance may be a heating by means of electron beam or a heating by means of high frequency induction in addition to a resistance heating method, however, a resistance heating is preferred in the present invention with respect to a relatively simple constitution and easy handling as well as being applicable easily and to grate many substances. Further, vapor source 4 may be a molecular beam source by means of a molecular beam epitaxial method.

Support rotating mechanism 5 contains, for example, support holder 5a to hold support S, rotation axis 5b to rotate said support holder 5a and motor (being not shown in the figure) which is arranged outside vacuum chamber 2 and works as a driving source of rotating axis 5b.

Herein, support holder 5a is preferably equipped with a heater (being not shown in the figure) to heat support S. Heating support S makes it possible to detach and eliminate absorbed substances from the surface of support S, resulting in generation of an impurity layer between the surface of support S and stimulable phosphor substance layer R, or to enhance adhesion and adjust the layer properties.

Further, a shutter (being not shown in the figure) may be provided between support S and vapor source 4 to shield the space from vapor source to support S. The shutter can prevent substances other than the evaporation objective, which have adhered on the surface of a stimulable phosphor substance, from adhering on a support by being evaporated at the initial stage of evaporation.

Next, an evaporation method by use of evaporation system 1 will be explained.

First, support S is held on support holder 5a. Next, the inside of vacuum chamber 2 is evacuated. Thereafter, support holder 5a is rotated against the vapor source by use of support rotating mechanism 5, and a stimulable phosphor substance is evaporated from heated vapor source 4 when a vacuum degree inside vacuum chamber 2 reaches a vacuum degree possible for evaporation resulting in growth of a desired thickness of the stimulable phosphor substance on the surface of support S. In this case, the distance between support S and vapor source 4 is adjusted between 100-1500 mm.

Further, in the above evaporation process, it is possible to perform evaporation dividing into plural times to form stimulable phosphor substance layer R. In an evaporation process, it is also possible to form a stimulable phosphor substance layer simultaneously with synthesizing an objective stimulable phosphor substance on support S by co-evaporation by utilizing a plural number of resistance heaters or electron beams.

Further, in an evaporation method, materials to be subjected to evaporation (a support, a protective layer or an intermediate layer) may be appropriately cooled or heated at the time of evaporation. Further, a stimulable phosphor substance layer may be subjected to a heat treatment after finishing evaporation. And, in an evaporation method, applied may be a reactive evaporation in which evaporation is performed by appropriately introducing a gas such as $O_2$ and $H_2$.

The thickness of formed stimulable phosphor substance layer R differs depending on application purposes of a radiographic image conversion panel and types of a stimulable phosphor substance, however, is in a range of 50-2000 μm, preferably 50-1000 μm and more preferably 100-800 μm, with respect to achieving the effects of the present invention.

Further, for forming stimulable phosphor substance layer R by the above evaporation method, the temperature of support S, on which stimulable phosphor substance layer R is formed, is preferably set at room temperature (RT) to. 300° C. and more preferably at 50-200° C.

A protective layer may be appropriately provided so as to cover stimulable phosphor substance layer R after which has been formed in the aforesaid manner. A protective layer may be formed by directly coating a protective layer coating solution on the surface of stimulable phosphor substance layer R, or by adhering a protective layer separately prepared in advance onto stimulable phosphor substance layer R.

As materials for the protective layer, applicable are general protective layer materials such as cellulose acetate, nitro cellulose, polymethylmethacrylate, polyvinyl butyral, polyethylene, polycarbonate, polyvinyl formal, polycarbonate, polyester, polyethylene terephthalate, polyethylene, polyvinylidene chloride, nylon, polytetrafluoroethylene, polytrifluoro monochloroehylene, a tetrafluoroethylene-hexafluoropropylene copolymer, a vinlidene chloride-vinyl chloride copolymer and a vinylidene chloride-acrylonitrile copolymer. In addition to this, a transparent glass substrate may be employed as a protective layer.

Further, as the protective layer, inorganic substances such as SiC, $SiO_2$, SiN and $Al_2O_3$ may be accumulated by an evaporation method or a sputtering method. The thickness of these protective layer is preferably 0.1-2000 μm.

EXAMPLES

In the following, the present invention will be specifically explained referring to examples, however, embodiments of this is not limited thereto.

(Preparation of Support)

A plural number of carbon fiber reinforced resin sheets being accumulated are heated at 130° C. and pressed at a pressure of 100 N/cm to prepare support S.

(Formation of Stimulable Phosphor Substance Layer)

Figure 4:
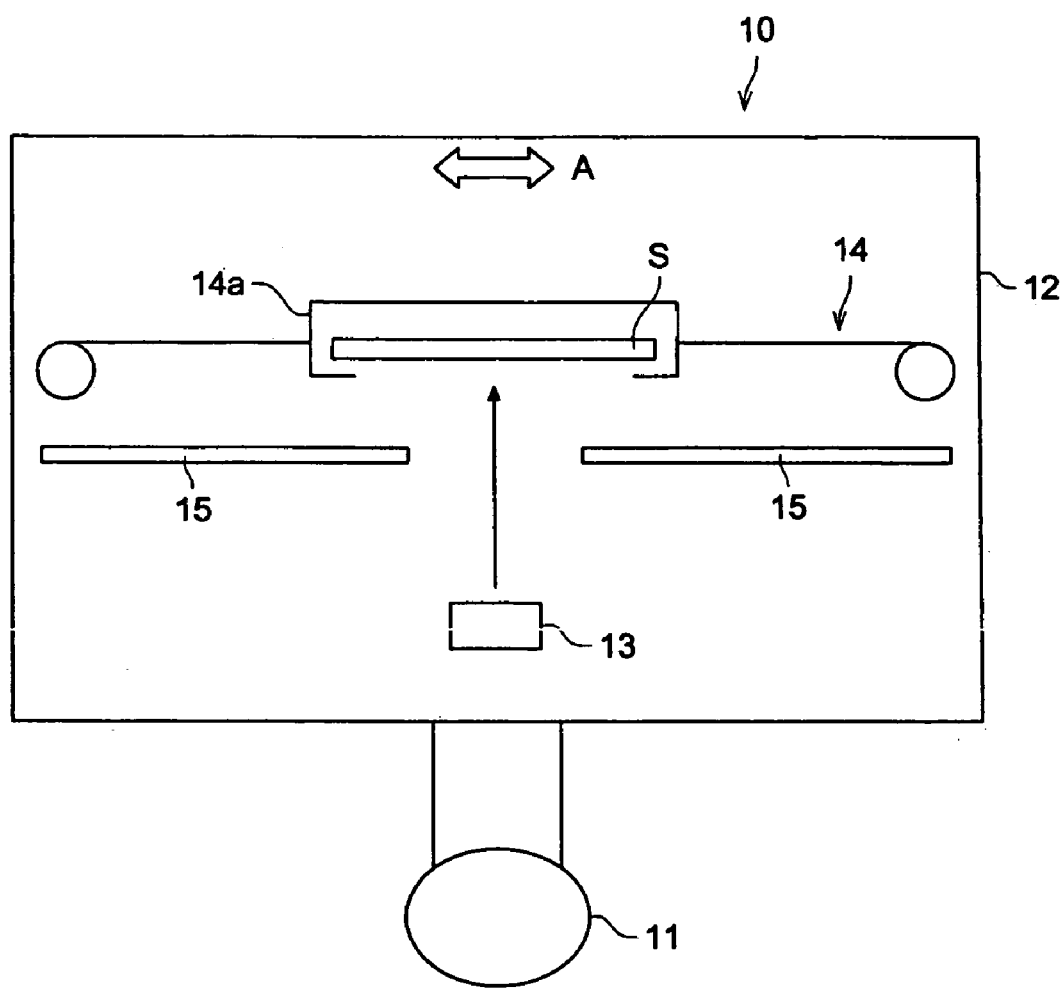
FIG. 4 is a cross-sectional drawing to show a brief constitution of a conventional evaporation system.

CsBr:0.0002 Eu as a stimulable phosphor substance was manufactured, which was evaporated on support S to form stimulable phosphor substance layer R, resulting in manufacture of radiographic image conversion panels of examples A-D and comparative examples 1 and 2 described below. Evaporation in examples A-D was performed by use of evaporation system 1 shown in FIG. 2, and evaporation in comparative examples 1 and 2 was performed by use of evaporation system 10 shown in FIG. 4.

Example A

First, the above-described stimulable phosphor substance (CsBr:0.0002Eu) as an evaporation material was filled into a resistance heating crucible inside vapor source 4, and support S was placed at support holder 5a.

Next, the distance between support S and vapor source 4 was adjusted to 400 mm.

Successively, after the inside of evaporation system 1 was once evacuated and an Ar gas was introduced to adjust a vacuum degree to 0.1 Pa, the temperature of support S was kept at 100° C. while support S was rotated at a rate of 10 rpm by support rotating mechanism 5. Then, the stimulable phosphor substance was evaporated onto support S by heating the resistance heating crucible to form a stimulable phosphor substance layer, and evaporation was finished when the thickness of the stimulable phosphor layer reached approximately 500 µm. Successively, the stimulable phosphor substance layer was taken into a protective layer bag under dry air resulting in preparation of a radiographic image conversion panel containing a stimulable phosphor substance layer being sealed.

Example B

After arranging a stimulable phosphor substance and a support in a similar manner to example A, the distance between support S and vapor source 4 was adjusted to 600 mm. Thereafter, a radiographic image conversion panel was manufactured in a similar manner to example A.

Example C

After arranging a stimulable phosphor substance and a support in a similar manner to example A, the distance between support S and vapor source 4 was adjusted to 800 mm. Thereafter, a radiographic image conversion panel was manufactured in a similar manner to example A.

Example D

After arranging a stimulable phosphor substance and a support in a similar manner to example A, the distance between support S and vapor source 4 was adjusted to 1000 mm. Thereafter, a radiographic image conversion panel was manufactured in a similar manner to example A.

Comparative Example 1

First, the above-described stimulable phosphor substance (CsBr:0.0002Eu) as an evaporation material was filled into a resistance heating crucible inside vapor source 13 of evaporation system 10 (refer to FIG. 4), and support S was placed at support holder 14a.

Next, the distance between support S and vapor source 13 was adjusted to 400 mm.

Successively, after the inside of evaporation system 10 was once evacuated and an Ar gas was introduced to adjust a vacuum degree to 0.1 Pa, the temperature of support S was kept at 100° C. while support S was transferred back and forth along direction A by support transfer mechanism 14. Then, the stimulable phosphor substance was evaporated onto support S by heating the resistance heating crucible to form a stimulable phosphor substance layer, and evaporation was finished when the thickness of the stimulable phosphor layer reached approximately 500 µm. Successively, the stimulable phosphor substance layer was taken into a protective layer bag under dry air resulting in preparation of a radiographic image conversion panel containing a stimulable phosphor substance layer being sealed.

Comparative Example 2

After arranging a stimulable phosphor substance and a support in a similar manner to comparative example 1, the distance between support S and vapor source 4 was adjusted to 1000 mm. A radiographic image conversion panel was manufactured; in a similar manner to comparative example 1 as for the following process.

The following evaluations were performed with respect to radiographic image conversion panels obtained in above-described examples A-D and comparative examples 1 and 2.

<Layer Thickness Distribution Characteristics>

With respect to the layer thickness distribution characteristics, layer thicknesses at 30 measuring points which were arranged in rows at equal intervals on a radiographic image conversion panel were measured, and measured points, where the layer thicknesses are nearly same, were connected by a curved line (this curved line is called as an iso-thickness line) to judge whether the layer thickness distribution is isotropic or anisotropic. Herein, that a layer thickness distribution is isotropic means that the layer thickness is nearly uniform at positions of an equal distance from the center of a panel and has no distribution depending on the directions from the center. While, that a layer thickness distribution is anisotropic means that the layer thickness has a distribution depending on the directions from the center of a panel.

Figure 3:
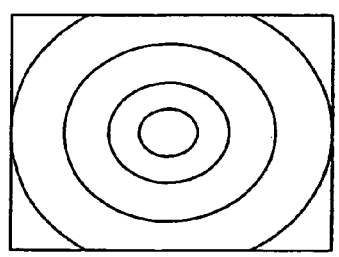
FIG. 3(a) is a drawing to show an example the layer thickness distribution of which is isotropic.
FIGS. 3(b) and 3(c) are drawings to show examples the layer thickness distributions of which are anisotropic.
Figure 3:
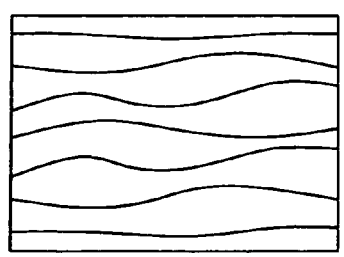
Figure 3:
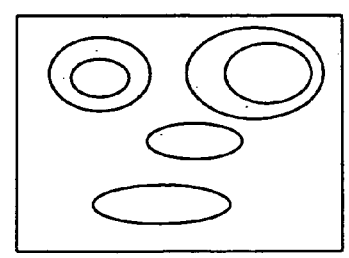

For example, it is judged to be isotropic when the iso-thickness lines spread homo-centrically (including a normal circle and an ellipse) from the center of a panel, as is shown in FIG. 3(a), and it is judged to be anisotropic when the iso-thickness lines stand in a row in one direction as is shown in FIG. 3(b) or several homo-centrically distributed iso-thickness lines exist locally as is shown in FIG. 3(c).

<Layer Thickness Distribution>

The layer thickness distribution is an index value to represent a degree of the layer thickness distribution of a stimulable phosphor substance in a stimulable phosphor substance layer. The layer thickness distribution was calculated according to following equation (2) by measuring the maximum layer thickness $D_{max}$ and the minimum layer thickness $D_{min}$ in a stimulable phosphor substance layer.

$$\text{Layer thickness distribution} = [(D_{max} - D_{min})/(D_{max} + D_{min})] \times 100(\%) \quad (2)$$

wherein, $D_{max}$: the maximum layer thickness
$D_{min}$: the minimum layer thickness <Coefficient of Variation>

The coefficient of variation is an index value to represent a degree of a layer thickness distribution of a stimulable phosphor substance in a stimulable phosphor substance layer, similar to the layer thickness distribution. The coefficient of variation was calculated by following equation (3) after measuring the layer thicknesses of a stimulable phosphor substance layer at 50 measurment points arranged in rows at equal intervals on a radiographic image conversion panel followed by determining an average layer thickness $D_{av}$ of each measurement point and a standard deviation $D_{dev}$ of the layer thickness.

$$\text{Coefficient of variation} = (D_{dev}/D_{av}) \times 100(\%) \quad (3)$$

wherein, $D_{dev}$: a standard deviation of the layer thickness
$D_{av}$: an average layer thickness <Coefficient of Variation of Activator Concentration within Phosphor Substance Layer Plane>

Each 0.2 g of the phosphor substance from arbitrary 30 points of a phosphor substance layer of the prepared radiographic image conversion panel was collected, and after this has been dissolved in an aqueous hydrochloric solution, the Eu concentration was determined from the calibration curve of an ICP measurement. The calibration curve was drawn by ICP measurement of a solution in which CsBr powder without containing Eu was dissolved after addition of an suitable amount of a Eu 1000 ppm standard solution for atomic absorption (manufactured by Kanto Chemicals Co., Ltd.). Further, a standard deviation was calculated with respect to the Eu concentrations of 30 points, and the relative standard deviation was divided by an average of activator concentrations at 30 points to determine a coefficient of variation represented by following equation (2).

$$\text{A coefficient of variation} = \text{standard deviation of activator concentrations in the plane/an average of activator concentrations} \quad (2)$$

<Coefficient of Variation of Activator Concentration in the Depth Direction of Phosphor Substance Layer>

The prepared radiographic image conversion panel was broken at an arbitrary portion by applying a physical force. Then, arbitrary 30 points in the broken cross section, specifically 5 points in the plane direction and 6 points in the depth direction, were selected, and a CsBr signal and a Eu signal each were measured in a region of 60 μm square of the selected points. Further, a mol ratio of Eu/CsBr was calculated, standard deviation with respect to concentration of the depth direction was determined, and the relative standard deviation was divided by an average of activator concentrations of 30 points to obtain a coefficient of variation represented by following equation (3).

$$\text{A coefficient of variation} = \text{standard deviation of activator concentrations of the depth direction/an average of activator concentration} \quad (3)$$

<Sensitivity Unevenness>

After radiation was uniformly irradiated on a radiographic image conversion panel from the support side, which was opposite to a stimulable phosphor substance, at a bulb voltage of 80 kVp, said radiographic image conversion panel P was excited by scanning with He—Ne laser light (wavelength of 633 nm). Then, stimulated emission irradiated from the stimulable phosphor substance layer was accepted by a receptor (a photomultiplier having a spectral sensitivity of S-5), with respect to 25 measurement points which are in rows at an equal interval on said radiographic image conversion panel, to measure the strength, and maximum strength $K_{max}$ and minimum strength $K_{min}$ among measured strength of each measurement point and average strength $K_{av}$ of each measured strength were determined resulting in calculation of the sensitivity unevenness according to following equation (4).

$$\text{Sensitivity unevenness} = ((K_{max}-K_{min})/K_{av}) \times 100 (\%) \quad (4)$$

wherein, $K_{max}$: the maximum strength
$K_{min}$: the minimum strength
$K_{av}$: the average strength <Relative Sensitivity>

The relative sensitivity represents a relative sensitivity against a radiographic image..conversion panel of comparative example 1 based on a stimurable irradiation strength of radiographic image conversion panel 1. In a similar manner to the case of sensitivity unevenness, strength of stimulated emission irradiated from the stimulable phosphor substance layer was measured with respect to 25 measurement points, which was designated as luminance to determine average luminance $K_1$ in comparative example 1 and average luminance $K_n$ in each examples A-D or comparative example 2 respectively, resulting in calculation of the relative sensitivity according to following equation (5).

$$\text{Relative sensitivity} = (K_n/K_1) \times 100 \quad (5)$$

wherein, $K_1$: an average luminance in comparative example 1

$K_n$: an average luminance in examples A-D or comparative example 2

<Bending>

The amount of bending of a radiographic image conversion panel was measured with respect to the two upside corners with a clearance gage when the radiographic image conversion panel was leaned against a highly upright stainless steel plate at an angle of 5 degree, and the panel was rotated by 180 degree to further measure the two upside corners of the panel with a clearance gage, resulting in determining the maximum value to be a bending amount (mm).

<Anti-Impact Property>

After dropping a steel ball of 500 g weight onto a radiographic image conversion panel from 20 cm height, the state of cracking was visually observed based on the following evaluation criteria. Further, after a radiation having a bulb voltage of 80 kVp was irradiated on the radiographic image conversion panel, the panel was excited by being scanned with He-Ne laser light (wavelength of 633 nm) to convert stimulated emission emitted from a phosphor substance layer into an electric signal (an image signal). Then the converted image signal was displayed out on a display means or printed out by a printing means and the output image was visually evaluated according to the following evaluation criteria.

The evaluation criteria of the anti-impact property are as follows.

A: No cracks were observed and the image was uniform without image unevenness.

B: No cracks were observed and the image quality was barely deteriorated.

C: Some cracks were observed and an image lack was observed, however, it was allowed in practical application.

D: Some cracks were observed and a definite image lack was observed, which was a problem in practical application.

The above evaluation results are shown in Table 1.

TABLE 1

| | Support | Support-evaporation source distance (mm) | Thickness distribution characteristics | Thickness distribution (%) | Coefficient of variation (%) | Sensitivity unevenness (%) | Relative sensitiveity | Bending (mm) | Anti-impact property |
|---|---|---|---|---|---|---|---|---|---|
| Example A | Rotation | 400 | Isotropic | ±18 | 26 | 17 | 101 | 0.6 | B |
| Example B | Rotation | 600 | Isotropic | ±13 | 15 | 13 | 103 | 0.5 | B |
| Example C | Rotation | 800 | Isotropic | ±8 | 8 | 10 | 105 | 0.3 | A |
| Example D | Rotation | 1000 | Isotropic | ±4 | 3 | 8 | 108 | 0.2 | A |
| Comparison 1 | Transfer | 400 | Anisotropic | ±40 | 50 | 42 | 100 (standard) | 4.0 | D |
| Comparison 2 | Transfer | 1000 | Anisotropic | ±30 | 45 | 33 | 95 | 4.7 | D |

It is clear from table 1 that radiographic image conversion panels (examples A-D), in which the distance between support S and vapor source 4 is adjusted to not less than 400 mm and evaporation is performed while rotating Support S, can decrease layer thickness distribution to not more than ±20%. The sensitivity unevenness is-decreased to not more than ±20%, which is one half of those of comparative examples 1 and 2, when the layer thickness distribution is decreased to not more than ±20%, resulting in improvement of the image quality. Similarly, radiographic image conversion panels of examples A-D can decrease a coefficient of variation to not more than 40% which remarkably decreases sensitivity unevenness as small as not more than 30%.

Further, as the layer thickness distribution is lowered to not more than ±20%, to not more than ±15%, to not more than ±10% and to not more than ±5%, the sensitivity unevenness is decreased as well as the relative sensitivity is increased, and in particular, example D, the layer thickness distribution of which is less than ±5%, the sensitivity unevenness is remarkably decreased and the relative sensitivity shows the maximum value among the examples. Similarly, it has been proved that as the coefficient of variation is decreased to not more than 40%, to not more than 30%, to not more than 20% and to not more than 10%, the sensitivity unevenness decreases as well as any of relative sensitivities is improved.

On the other hand, in examples A-D, in which evaporation was performed while rotating support S, the layer thickness distribution characteristics are all provided with an-isotropic property, and the bending is extremely small as not more than 1.0 mm compared to comparative examples 1 and 2. Further, in examples A-D provided with an isotropic property also with respect to the anti-impact property, cracks are hardly observed and, in particular, examples C and D, the layer thickness distributions of which are small, can even achieve excellent image quality. While, in comparative examples 1 and 2, even in comparative example having an isotropic property, cracks are observed and evaluation rank of an anti-impact property is low.

The radiographic image conversion panel of the present invention having a low amount of a density variation coefficient of the activator in a surface direction of the phosphor layer, and the radiographic image conversion panel of the present invention having a density distribution of the activator in the phosphor layer being isotropic from a center of the radiographic image conversion panel were proved to exhibit a high anti-impact property.

The aforesaid effect is considered to be produced by an increased isotropic property of the panel which results in a decreased stress in the panel. The decreased stress in the panel is considered to achieve a decreased bending which produced a high anti-impact property. The increased isotropic property of the panel can be achieved by extending the distance between the support and the vapor source.

What is claimed is:

1. A radiation image conversion panel comprising a substrate having thereon a phosphor layer formed by a vapor-accumulation method, wherein the phosphor layer has a thickness distribution of not more than +/−5%, the thickness distribution being defined by the following formula:

$$((D_{max}-D_{min})/(D_{max}+D_{min}))\times 100,$$

provided that $D_{max}$ is a maximum thickness of the phosphor layer; and $D_{min}$ is a minimum thickness of the phosphor layer;

the thickness distribution of the phosphor layer is isotropic from a center of the radiation image conversion panel; and the phosphor layer contains an alkali metal halide stimulable phosphor represented by Formula (I):

$$M1X.aM2X'_2bM3X''_3: eA \qquad \text{(Formula I)}$$

wherein, M1 represents an alkali metal atom selected from the group consisting of Li, Na, K, Rb and Cs; M2 represents a divalent metal atom selected from the group consisting of Be, Mg, Ca, Sr, Ba, Zn, Cd, Cu and Ni; M3 represents a trivalent metal atom selected from the group consisting of Sc, Y, La, Ce, Pr, Nd, Pm, Eu, Gd, Tb, Dy, Ho, Er, Tm, Yb, Lu, Al, Ga and In, X, X' and X" each represent independently a halogen atom selected from the group consisting of F, Cl, Br and I; A represents a metal atom selected from the group consisting of Eu, Tb, In, Ce, Tm, Dy, Pr, Ho, Nd, Yb, Er, Gd, Lu, Sm, Y, Tl, Na, Ag, Cu and Mg; and a, b and e each represents a number in a range of $0 \leq a < 0.5$, $0 \leq b < 0.5$ and $0 \leq e < 1.0$, respectively.

2. A method of producing the radiation image conversion panel of claim 1, comprising:

placing the phosphor in a vapor source in a vacuum chamber of an evaporating apparatus; and heating the vapor source so as to deposit the phosphor onto the substrate which is held by a supporting member ion the vacuum chamber;

wherein the substrate is rotated during the heating with respect to the vapor source by the supporting member which is provided with a rotation mechanism.

3. The radiation image conversion panel of claim 1, wherein the thickness distribution of the phosphor layer is isotropic from a center of the radiation image conversion panel, and the phosphor layer has a thickness variation coefficient of not more than 40%, the thickness variation coefficient being defined by the following formula:

$$(D_{dev}/D_{av})\times 100$$

provided that $D_{av}$ is an average thickness of the phosphor layer, and $D_{dev}$ s a standard deviation of thickness of the phosphor layer.

4. The radiation image conversion panel of claim 3, wherein the phosphor layer has a thickness variation coefficient of not more than 30%.

5. The radiation image conversion panel of claim 3, wherein the phosphor layer has a thickness variation coefficient of not more than 20%.

6. The radiation image conversion panel of claim 3, wherein the phosphor layer has a thickness variation coefficient of not more than 10%.

7. A method of producing the radiation image conversion panel of claim 3, comprising:

placing the phosphor in a vapor source in a vacuum chamber of an evaporating apparatus; and heating the vapor source so as to deposit the phosphor onto the substrate which is held by a supporting member ion the vacuum chamber;

wherein the substrate is rotated during the hating with respect to the vapor source by the supporting member which is provided with a rotation mechanism.

* * * * *